United States Patent
Lankin et al.

[19]

[11] Patent Number: 5,878,189
[45] Date of Patent: Mar. 2, 1999

[54] CONTROL SYSTEM FOR A SEPARATELY EXCITED DC MOTOR

[75] Inventors: Robert Lankin, Newton, Canada; Joe K Hammer, St. Marys, Ohio; Christopher M Killian, New Breman, Ohio; David A Meyer, Wapakoneta, Ohio

[73] Assignee: Crown Equipment Corporation, New Bremen, Ohio

[21] Appl. No.: 889,227

[22] Filed: Jul. 8, 1997

Related U.S. Application Data

[60] Provisional application No. 60/016,097 filed Jul. 9, 1996.
[51] Int. Cl.$^6$ ...................................................... H02P 5/178
[52] U.S. Cl. ........................ 388/801; 388/907.5; 318/432
[58] Field of Search ............................... 388/801, 907.2, 388/907.5; 318/244, 245, 432, 433

[56] References Cited

U.S. PATENT DOCUMENTS

| | | | |
|---|---|---|---|
| 4,079,301 | 3/1978 | Johnson, III | 318/338 |
| 4,408,147 | 10/1983 | Gabel | 318/493 |
| 4,422,022 | 12/1983 | Hill et al. | 318/376 |
| 4,520,299 | 5/1985 | Konrad . | |
| 5,039,924 | 8/1991 | Avitan | 318/139 |
| 5,070,283 | 12/1991 | Avitan | 318/139 |
| 5,264,763 | 11/1993 | Avitan | 318/139 |
| 5,349,279 | 9/1994 | Avitan | 318/803 |
| 5,453,672 | 9/1995 | Avitan | 318/493 |
| 5,585,706 | 12/1996 | Avitan | 318/493 |
| 5,642,023 | 6/1997 | Journey | 318/493 |

FOREIGN PATENT DOCUMENTS

| WO91 15379 A | 10/1991 | WIPO . |
|---|---|---|
| 93-19949 | 10/1993 | WIPO . |
| 93-20611 | 10/1993 | WIPO . |

OTHER PUBLICATIONS

Yamada Chihiro; Torque Measuring Method and Equipment and Torque Controller and Dynamometer Using the Former; Patent Abstracts of Japan, 06311775, 11 Nov. 1994.

S Funabiki, T. Fukushima; Current Commands for High–efficiency Torque Control of DC Shunt Motor; IEE Proceedings–B, vol. 138, No. 5; Sep. 1991.

Automatic Armature and Field control of DC Motors, M.H.Rashid; IEEE Proc, v 128, pt. B, No. 1, Jan. 1981, p. 73.

Microprocessor–based Optimal–Efficiency Drive of an Induction Motor, Min Ho Park, Seung Ki Sul; IEEE Transactions on Industrial Electronice, vol. 1E–31, No. 1, Feb. 1984, p. 69.

Microprocessor–Based Optimal Efficiency Drive of a Separately Excited DC Motor Soon Chan Hong, Min Ho Park (Source unknown, date unknown) pp. 126–128.

Microprocessor–Based High Efficiency Drive of a DC Series Motor, Min Ho Park, Soon Chan Hong; IECON '84, p. 455.

Microprocessor–Based High Efficiency Drive of a DC Series Motor, Soon Chan Hong, Min Ho Park; IEEE Transactions on Industrial Electronics, vol. IE–34, No. 4, Nov. 1987.

Mathematical Modeling and Computer Simulation of a Separately Excited dc Motor with Independent Armature/Field Control, Isaac Avitan, Victor Skormin; IEEE Transactions on Industrial Electronics, vol. 37, No. 6, Dec. 1990.

Improvement in Energy Efficiency of Induction Motors by means of Voltage Control, N. Mohan; IEEE Transactions on Power Applications and Systems, vol. PAS–99, No. 4, Jul/Aug. 1980.

*Primary Examiner*—Bentsu Ro
*Attorney, Agent, or Firm*—Killworth, Gottman, Hagan & Schaeff LLP

[57] ABSTRACT

A microprocessor based control system generates optimal field and armature currents for a separately excited DC motor. The current levels for the field and armature coils are set by feedback control. Armature and field current setpoints are established in accordance with tabulated values selected for providing a required torque and speed in an optimal fashion. A table of corresponding values of armature voltage is also maintained. If the actual armature voltage is below the calculated value, then the field current setpoint is boosted by an amount sufficient to optimize output torque.

6 Claims, 5 Drawing Sheets

CONTROL SYSTEM FOR A SEPARATELY EXCITED DC MOTOR

CROSS REFERENCE TO RELATED APPLICATIONS

This application claims the benefit of U.S. Provisional Application Ser. No. 60/016,097, CONTROL SYSTEM FOR A SEPARATELY EXCITED DC MOTOR, filed Jul. 9, 1996.

BACKGROUND OF THE INVENTION

This invention relates to a microprocessor based control system which provides optimal field and armature currents to control a separately excited direct current (DC) motor.

The use of microprocessor control for the purpose of independently controlling the field and armature currents in direct current motors to achieve maximum efficiency is described in an article by Soon Chan Hong and Min Ho Park in IEEE Transactions on Industrial Electronics, Vol IE-34, No. 4, November 1987.

One problem with microprocessor or computer control of separately excited motors results from the fact that the field flux expected from a given field current, as derived from the motor equations employed, is not always as expected. The actual field flux will differ due primarily to magnetic hysteresis in the field poles; thus, while the theory may predict optimal motor performance under given torque and speed conditions, in reality, the resulting efficiency is often less than expected or desired.

SUMMARY OF THE INVENTION

In the present invention, the effects of field pole hysteresis in a separately excited direct current motor is removed by providing a compensating field current control signal.

In the preferred embodiment of the invention, field and armature current setpoints are established in accordance with tabulated values selected for providing a required torque and speed in an optimal fashion. A table of corresponding values of armature voltage is also maintained. The current levels for the field and armature coils are set by feedback control.

It is a feature of the invention that flux losses are detected indirectly by measuring the armature voltage. When the flux decreases, there is a reduction of back EMF acting on the armature. The armature current controller reacts automatically to any reduction of back EMF by lowering a time-averaged driving voltage which it supplies to the armature. A voltage sensor sends measured values of armature voltage to an armature voltage comparator for comparison with expected values thereof as read out from the above-mentioned table. The differences are used for adjusting the field current setpoint and thereby boosting the flux.

The torque loss caused by a flux loss effectively reduces the forward loop gain and increases the time required to respond to a speed request. The controller of this invention compensates by using a table of armature voltage values to determine an armature voltage reference point. An armature voltage sensor then measures the average armature voltage and sends the measured value back to the microprocessor. The microprocessor compares the measured armature voltage with the reference point and multiplies the difference by a variable gain factor to obtain a correction term. The correction term then is added to the field current setpoint in order to boost flux as required.

It is therefore an object of this invention to provide an efficient control system for a separately excited direct current motor by adjusting the field flux intensity in response to deviations in armature voltage from expected values.

It is another object of this invention to provide an apparatus for controlling a direct current motor having a separately excited field coil and an armature coil, the apparatus comprising: an input circuit for providing a required speed value; a speed sensor for sensing the rotation of the motor and generating a required torque signal in response thereto; a control circuit for establishing separate field current values and armature current values based on the torque value for a given speed of the motor; a field coil driver connected for delivering field current to said field coil at levels corresponding to said field current values, and thereby establishing a corresponding flux field; an armature coil driver connected for delivering armature currents to said armature coil at levels corresponding to said armature current values such that said armature coil attempts to generate said required torque in reaction to said flux field; the improvement comprising establishing expected armature voltage values in response to required torque and actual speed values, an voltage sensor connected to the armature for sensing an armature voltage value; an armature voltage comparator for generating armature voltage error signals corresponding to differences between said armature voltage values and said expected armature voltage values; and a field current adjustment apparatus for adjusting said field current values, and thus the flux field, in correspondence with said armature voltage error signals thereby to obtain from said motor the desired torque value.

Other objects and advantages of the invention will be apparent from the following description, the accompanying drawings and the appended claims.

DESCRIPTION OF THE PREFERRED EMBODIMENT

Figure 1:
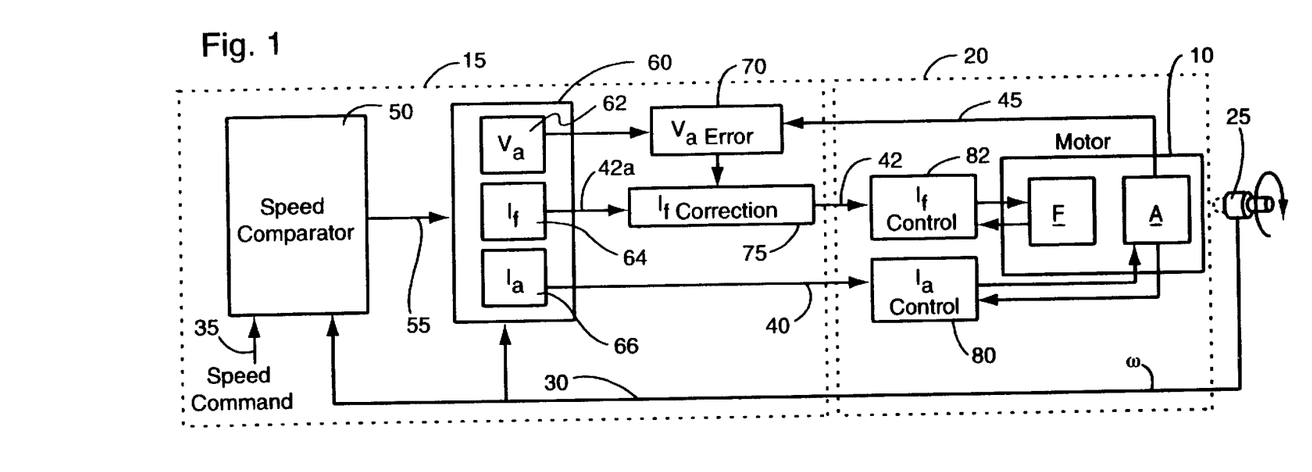
FIG. 1 is a simplified electrical block diagram showing the various components comprising the present invention.

Referring now to the drawings, and particularly to FIG. 1, which is a simplified electrical block diagram showing the present invention, a motor 10 is controlled by a microprocessor 15 and a motor control circuit 20. An speed sensor (an encoder or tachometer) 25 provides an output on line 30 representing the actual speed (•) of the motor.

Shown within the microprocessor 15 are several blocks which are actually functions performed by computer algorithms or routines. The major blocks or routines include a speed comparator function 50, a set of two-way look up tables 60, an armature voltage error function 70 and a field current correction function 75.

The speed comparator function 50 compares a speed command signal on line 35 to the actual motor speed signal on line 30 and in response thereto provides a torque command signal 55 to the look up tables 60.

Look-up table 62 contains a matrix of expected armature voltage, table 64 contains a matrix of field current instructions, and table 66 contains a matrix of armature current instructions. Based upon the actual speed and the torque command signal 55, field current If and armature current $I_a$, setpoints are produced by the look-up tables 64 and 66 and applied to the motor control circuit 20. The field current setpoint may be adjusted by the field current correction function 75, as will be explained.

A voltage signal on line 45 from the motor's armature, from which flux level is derived, is fed back to the microprocessor 15, and particulary to the voltage error function 70. The field current setpoint $I_f$ is corrected in the microprocessor by the output of look-up table 62 and the armature voltage $V_a$ error function 70, which are combined in block 75, the field current $I_f$ correction function. If the armature voltage on line 45 is not what is expected, based on the torque command signal 55 and actual speed of the motor represented on line 30, then field current $I_f$ correction signal from block 75 will adjust or boost the field current signal on line 42 by an amount sufficient to bring it into line.

Figure 4:
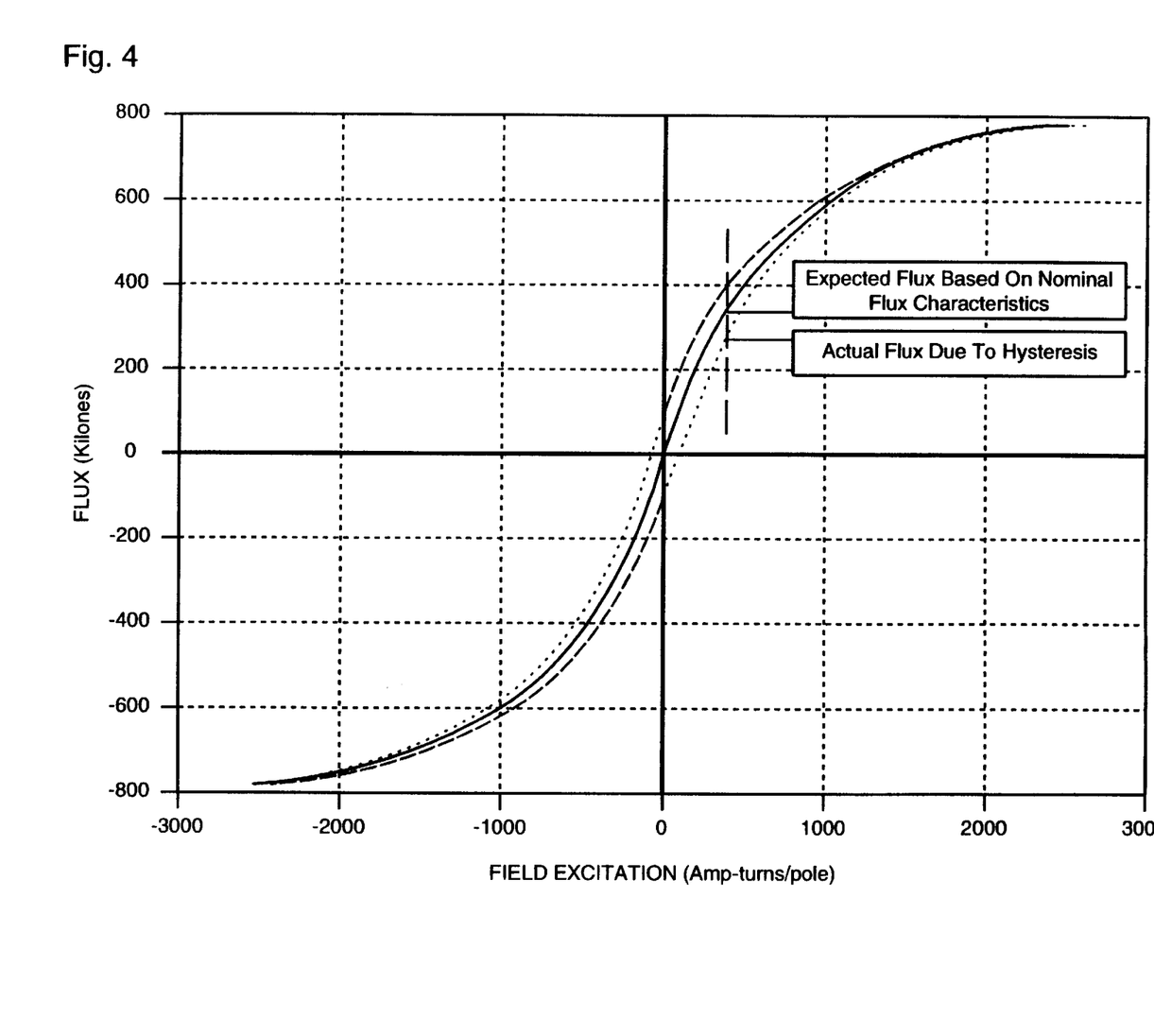
FIG. 4 is a chart showing the relationship between the magnetic field of the motor and field excitation.

The reason armature voltage will not be as expected is due to hysteresis in the motor field poles, as illustrated by FIG. 4. The armature voltage in table 62 is calculated based on the expected flux based on the nominal flux characteristics of the particular motor, which is represented in FIG. 4 as the solid line. The actual flux of the motor will be somewhat different, due to hysteresis, as represented by the dotted line. It is this difference in flux that will be corrected by adjusting or boosting the field current.

Within the motor control circuit 20 are closed loop control circuits for maintaining both the armature and the field current at the desired values, namely, armature current $I_a$ control circuit 80 and field current $I_f$ control circuit 82. The outputs from these circuits are connected to the armature A and field F of the motor 10. These circuits receive feed back inputs from current sensors associated with the motor.

Figure 2:
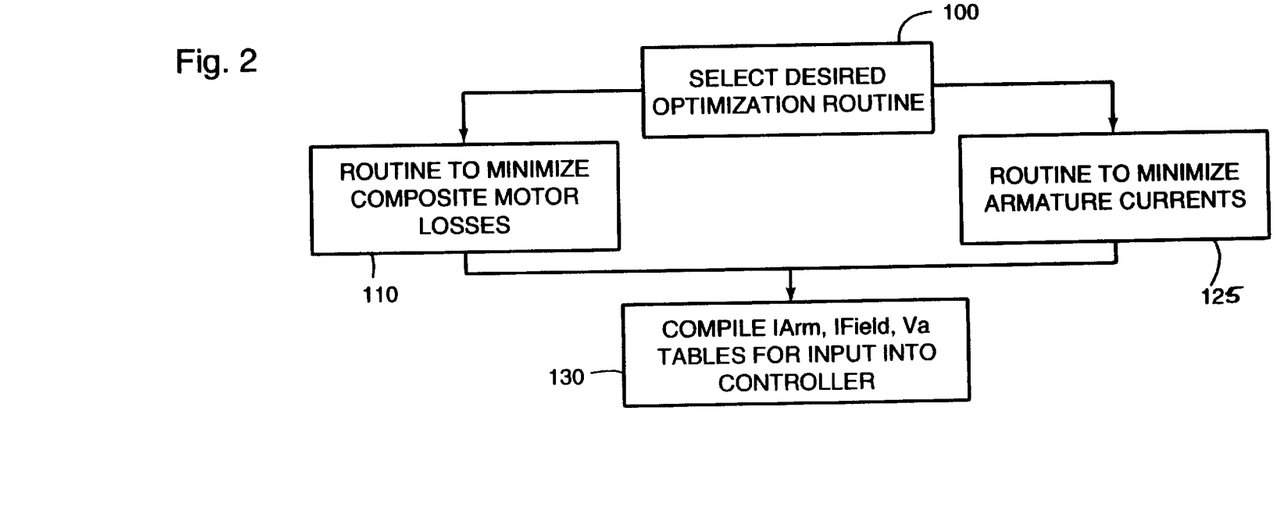
FIG. 2 is a simplified flow chart showing the steps for creating the look-up tables utilized in the present invention.
Figure 3:
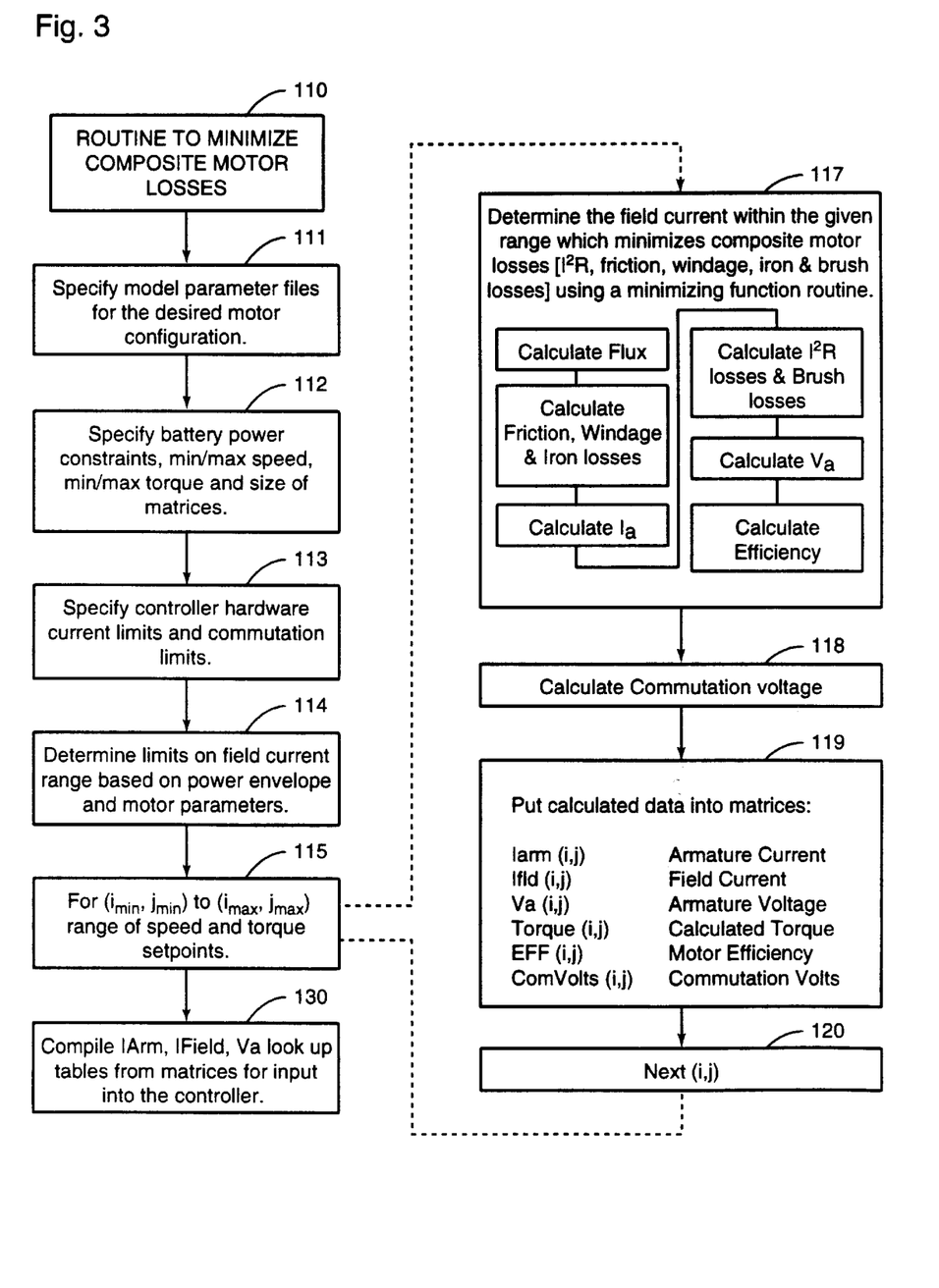
FIG. 3 is a flow chart showing the steps for creating look-up tables that minimize composite motor losses.

The values stored in the look-up tables 60 are determined by the process represented in FIGS. 2 and 3. Depending upon the particular use of the motor, one may chose either to minimize motor losses or to minimize armature currents. Thus, in FIG. 2, block 100 represents the first choice, selecting the desired optimization routine; block 110 represents the routine to minimize composite motor losses; block 125 represents the routine to minimize armature current losses, and block 130 represents the tables $I_a$, $I_f$, and $V_a$ that are compiled for controlling the motor and represented in FIG. 1 as the set of tables 60.

FIG. 3 represents the routine 110 for minimizing composite motor losses. The first step (block 111) is to specify model parameter files for the desired motor configuration. The second step, block 112, is to specify battery power constraints, minimum and maximum speed, minimum and maximum torque and look-up table size. The next step (block 113) is to specify controller hardware current limits and commutation limits. Next (block 114), determine limits on field current range based on power envelope and motor parameters. In block 115, for $(i_{min}, j_{min})$ to $(i_{max}, j_{max})$ range of speed and torque setpoints, determine (in block 117) the field excitation current within the given range which results in minimum composite motor losses using a minimizing function routine. Commutation voltage is calculated in block 118 and this data is put into matrices (block 119). The process is then repeated (block 120) for each element (i, j) in the tables. Finally, the tables are compiled (block 130) and stored. Thus, the following items are calculated and stored: Armature current $I_{arm}$ (i,j), Field current $I_{fld}$ (i,j), Armature voltage $V_a$ (i,j), Motor efficiency EFF (i,j), and Commutation Voltage ComVolts (i,j). In the present invention, only the first three items are used.

A routine for minimizing armature currents may also be employed, if desired. Such a routine requires the determination of field excitation that results in minimum armature currents for each pair of speed and torque setpoints. Of course, other motor characteristics could be chosen for optimization, if desired.

Table 1 is an example of a look-up table giving the desired armature current $I_a$ for various values of torque T setpoints (left vertical column) and actual speed (top row). Similarly, Table 2 is an example of a look-up table for desired field current $I_f$ at specified torques and speeds. Table 3 is an example of a look-up table that provides expected armature voltages $V_a$ at those specified torques and speeds.

The torque value T in newton-meters is provided by the speed comparator function 50 of the microprocessor 15 and the actual speed value is provided by the encoder 25. Speed is given in radians/second. It is to be understood that the tables are only examples that are limited to a small range of speeds. In the preferred embodiment of this invention, the torque values in each table are in 5 newton-meter increments and the speed range from 0 to 400 radians/second.

These tables are unique to a given motor configuration or design since they are generated with reference to such factors that include but are not limited to the size, torque and speed of the motor and internal motor losses. Since the resolution of the table is limited, interpolation is used to determine values of $I_f$, $I_a$ and $V_a$ for intermediate speed and torque values.

TABLE 1

| | $I_a$-Armature Current | | | |
|---|---|---|---|---|
| T/Speed | 64 | 80 | 96 | 112 |
| 80 | 529 | 479 | 395 | 290 |
| 70 | 529 | 479 | 395 | 284 |
| 60 | 467 | 468 | 395 | 247 |
| 50 | 393 | 394 | 395 | 209 |
| 40 | 318 | 319 | 320 | 172 |
| 30 | 243 | 245 | 246 | 135 |
| 20 | 167 | 170 | 171 | 96 |
| 10 | 94 | 95 | 96 | 60 |
| 0 | 20 | 21 | 22 | 23 |

TABLE 2

| | $I_f$-Field Current | | | |
|---|---|---|---|---|
| T/Speed | 64 | 80 | 96 | 112 |
| 80 | 28.3 | 29.0 | 29.1 | 26.6 |
| 70 | 28.3 | 29.0 | 29.1 | 29.1 |
| 60 | 29.4 | 29.5 | 29.1 | 28.6 |
| 50 | 28.9 | 29.0 | 29.1 | 29.7 |
| 40 | 29.1 | 29.2 | 29.3 | 28.9 |
| 30 | 29.6 | 28.4 | 28.5 | 28.0 |
| 20 | 28.4 | 28.5 | 28.7 | 26.6 |
| 10 | 28.6 | 29.1 | 29.7 | 26.9 |
| 0 | 7.0 | 6.3 | 5.8 | 5.4 |

TABLE 3

| T/Speed | $V_a$-Armature Voltage | | | |
|---|---|---|---|---|
| | 64 | 80 | 96 | 112 |
| 80 | 15.8 | 17.5 | 18.8 | 20.4 |
| 70 | 15.8 | 17.5 | 18.8 | 19.7 |
| 60 | 15.2 | 17.4 | 18.8 | 19.2 |
| 50 | 14.5 | 16.6 | 18.8 | 18.8 |
| 40 | 13.7 | 15.8 | 18.0 | 18.2 |
| 30 | 12.8 | 14.9 | 17.1 | 17.6 |
| 20 | 11.8 | 13.9 | 16.1 | 16.8 |
| 10 | 10.6 | 12.7 | 14.9 | 16.8 |
| 0 | 6.0 | 6.9 | 7.8 | 8.6 |

Figure 5:
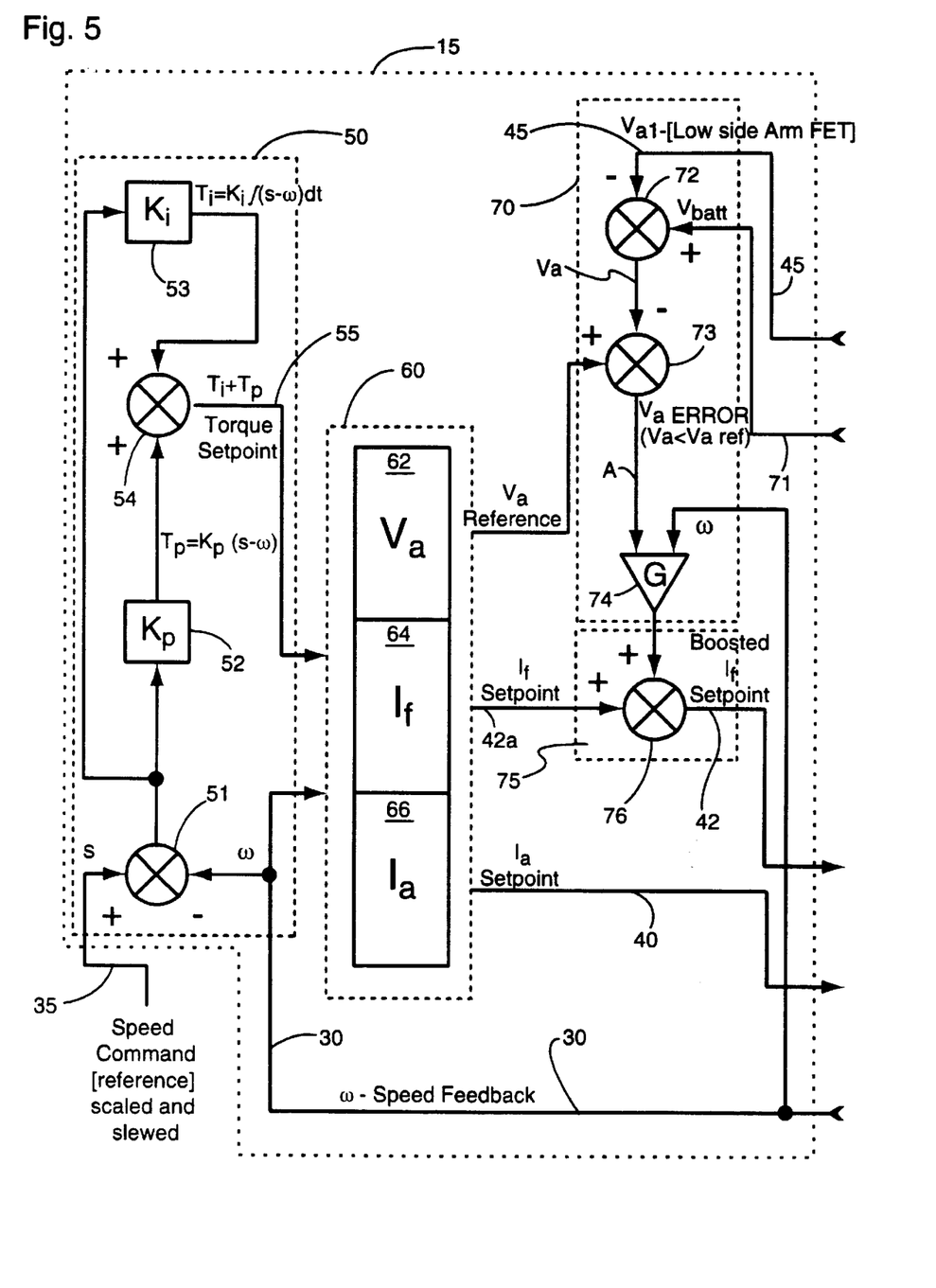
FIGS. 5 and 6 together comprise a more detailed electrical block diagram showing the components comprising the present invention.
Figure 6:
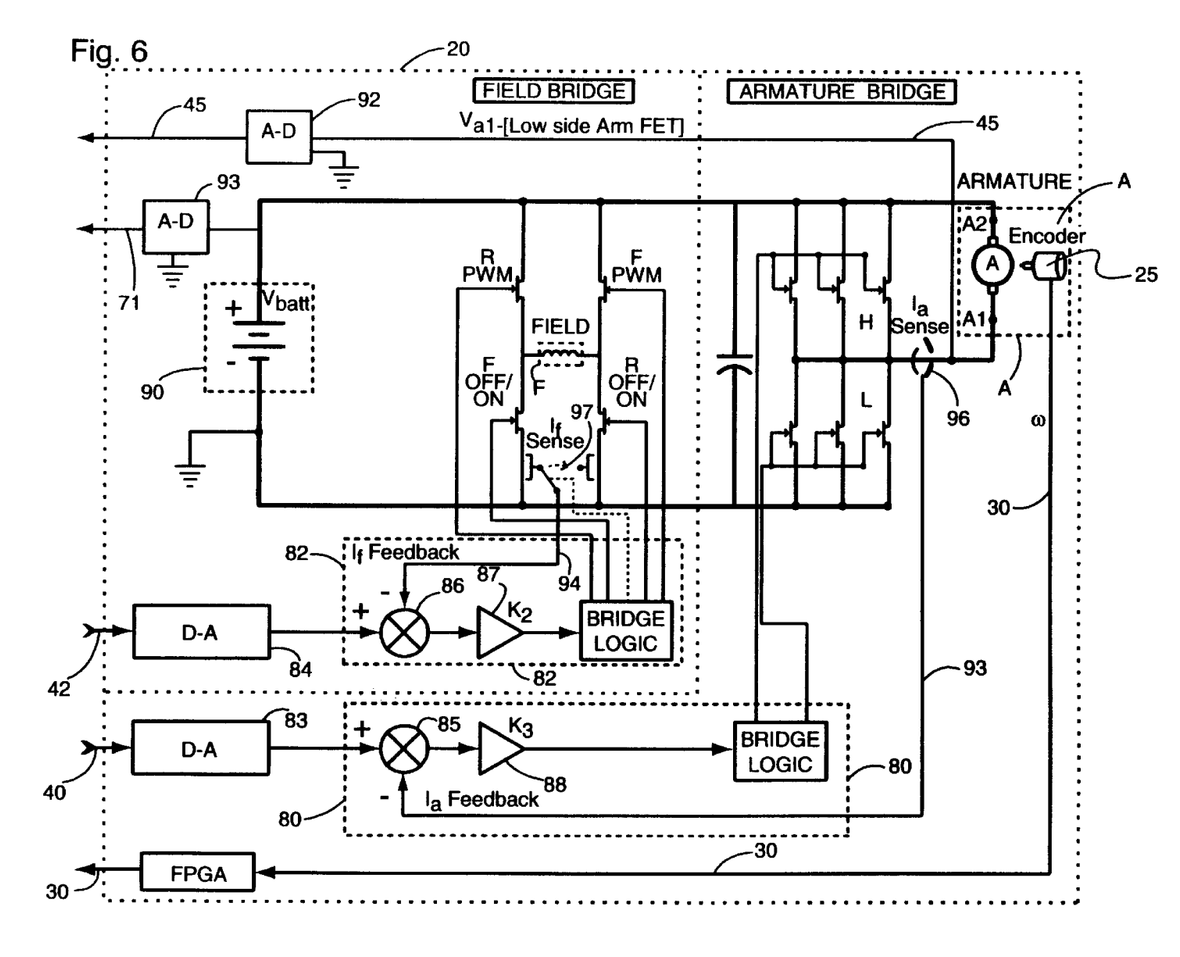

Reference is now made to the more complete block diagram of the invention contained in FIGS. 5 and 6. The speed command signal 35 (s) and the actual speed signal 30 (•) are applied to the speed comparator function 50 in the microprocessor 15, and specifically to a comparator 51, the output of which is applied to amplifier function 52 which has a gain Kp set to command a torque high enough for rapid response to a speed error but low enough to avoid stability problems. Thus, the output of amplifier 52 is Tp=Kp(s−•).

Proportional plus integral control is achieved by integrating the speed error and adding the result to the output of amplifier 52. This is done by amplifier function 53, which integrates the output of comparator 51. Thus, its output is Ti=Ki∫(s−•)dt. The outputs of amplifiers 52 and 53 are added by function 54, giving a torque setpoint signal T=Ti+Tp on line 55.

The amplifier function 52 provides the initial response to a new speed command. The response from the integrator 53 builds up slowly and predominates as the speed error is driven to zero. The steady state output from the integrator produces torque setpoint values appropriate for handling a steady state load with no error signal from the speed comparator 51.

The armature voltage $V_a$ error function 70 includes a comparator function 72 that received a signal representing battery voltage on line 71 and a signal representing the voltage $V_{al}$ from the low voltage side of armature A on line 45. Both lines 45 and 71 include analog to digital, or A–D, converter circuits, 92 and 93.

The output $V_a$ of comparator function 72 is compared with the output $V_{a\text{-}reference}$ from look-up table 62. If the voltage output signal $V_a$ of comparator 72 is less than what is called from by the look-up table, then an output is generated and applied to amplifier 74 (along with the speed signal •). The output of amplifier 74 is added to the $I_f$ setpoint signal on line 42a in adder function 76 to produce a boosted $I_f$ setpoint on line 42.

The back EMF E of a motor is defined as E=K×B×S, where K is a motor design constant, B is the flux in the air gap of the motor, and S is the rotational speed of the armature. Differentiating the equation with respect to $I_f$ yields $$dE = K \times dB/dI_f \times S \times dI_f.$$

Rearranging the equation for $dI_f$ yields $dI_f = (dE/S) \times (dI_f/dB/K)$. In practice, this equation is implemented in the Field Boost Gain term G in the following form:

$$If_{correction} = V_{a\ error} \times C_1 \times [\text{Variable Gain Parameter}]/S$$

where the magnitude of $If_{correction}$ required for a given $V_a$ error is seen to be inversely proportional to the actual speed S of the motor.

$C_1$ is a constant which includes motor constant K, scaling corrections, and a nominal coefficient for $dI_f/dB$, which in reality is variable over the operating range. The Variable Gain Parameter is used for tuning of the boost feature.

The armature current $I_a$ and boosted field current $I_f$ setpoint values 40 and 42 are applied to closed-loop coil driver circuits 80 and 82 (FIG. 6) after being converted to analog form by a digital-to-analog converters 83 and 84. The two coil driver circuits include current delivery circuits including a bridge logic arrangement which apply switching signals to an arrangement of MOSFET devices that separately regulate the flow of current from a battery 90 to the field and armature coils F and A, respectively. Each driver circuit (80, 82) includes a current sensor (96, 97) which generates a feedback signal ($I_a$ feedback 93 and $I_f$ feedback 94) proportional to the respective measured current. These feedback signals are applied to a pair of comparators 85, 86 for comparison with corresponding setpoint values. The comparators then generate an armature current error signal and a field current error signal.

A pair of amplifiers 87, 88 multiply the field current error signal and the armature current error signal by gain factor $K_2$ and $K_3$ respectively. These circuits cause a pair of pulse width modulated (PWM) drives to supply battery current to the motor coils in pulses of constant amplitude (which varies as a function of battery state of charge) and frequency and with duty cycles corresponding to the respective setpoint values. This effectively sets the average field current and the average armature current so as to develop the desired torque in the armature.

It should be appreciated that the armature voltage as represented on line 45 will reflect flux losses. If there has been an unexpected loss of field flux, the torque generated by the motor will decrease. There will also be a concomitant decrease in the back EMF opposing the armature current driver, so the armature driver generates less average voltage to supply the demand for armature current. Therefore, in the present invention, actual armature voltage is compared to a desired armature voltage at a given torque and speed and is used to adjust the nominal field current value to achieve the desired actual torque.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. Apparatus for separately exciting a field coil and an armature coil of a direct current motor comprising:
   (a) a matrix of field current values stored in a digital memory at addresses which may be accessed by combined torque values and speed values;
   (b) a matrix of armature current values stored in said digital memory at addresses which may be accessed by said torque values and said speed values, said armature current values being related to said field current values in such a way that said torque values and said speed values will access optimal combinations of field current and armature current capable of producing torques corresponding to said addresses while said motor rotates at speed associated therewith;
   (c) a microprocessor programmed for generating said addresses in response to speed signals and speed error signals and downloading said field current values and said armature current values;
   (d) a field coil driver connected for delivering field currents to said field coil at levels corresponding to said field current values, and thereby establishing a corresponding flux field;

(e) an armature coil driver connected for delivering armature currents to said armature coil at levels corresponding to said armature current values, so that said armature coil generates said torques in reaction to said flux field and rotates at said speeds;

(f) a speed sensor connected for sensing the speed of rotation of the armature coil and generating said speed signals in response thereto; and (g) an input circuit connected for receiving speed reference signals and generating said speed error signals in accordance with differences between said speed reference signals and said speed signals.

2. The apparatus according to claim 1 wherein said field coil driver comprises field current delivery circuit responsive to field current error signals for delivering said field currents to said field coil, a field current sensor for sensing said field currents and generating field current feedback signals corresponding thereto, and a field current comparator for comparing said field current values with said field current feedback signals and generating said field current error signals in correspondence with differences therebetween.

3. Apparatus according to claim 2 wherein said armature coil driver comprises armature current delivery means responsive to armature current error signals for delivering said armature currents to said armature coil, an armature current sensor for sensing said armature currents and generating armature current feedback signals corresponding t here to, and an armature current comparator for comparing said armature current values with said armature current feedback signals and generating said armature current error signals in correspondence with differences therebetween.

4. Apparatus according to claim 3 further comprising an voltage sensor connected to the armature for sensing an the armature voltage value;

a matrix of expected armature voltage values stored in said digital memory at addresses which may be accessed by said torque values and said speed values, an armature voltage comparator for generating armature voltage error signals corresponding to differences between said armature voltage values and said expected armature voltage values; and field current adjustment means for adjusting said field current values i n correspondence with said armature voltage error signals.

5. An apparatus for controlling a direct current motor having a separately excited field coil and an armature coil, said apparatus comprising:

an input circuit for providing a desired motor speed value;

a speed sensor for sensing the rotation of said motor;

a control circuit for establishing separate field current values and armature current values based on the torque signal for a given speed of the motor;

a field coil driver connected for delivering field current to said field coil at levels corresponding to said field current values, and thereby establishing a corresponding flux field;

an armature coil driver connected for delivering armature currents to said armature coil at levels corresponding to said armature current values such that said armature coil attempts to generate a desired torque in reaction to said flux field;

the improvement comprising a circuit for providing expected armature voltage values for any given value of torque and motor speed, a voltage sensor connected to the armature for sensing an armature voltage value;

an armature voltage comparator for generating armature voltage error signals corresponding to differences between said armature voltage values and said expected armature voltage values; and a field current adjustment apparatus for adjusting said field current values, and thus the flux field, in correspondence with said armature voltage error signals thereby to obtain from said motor a desired torque value.

6. Apparatus of claim 5 wherein said circuit for providing expected armature voltage values for any given value of torque and motor speed includes a matrix of expected armature voltage values stored in a digital memory at addresses which may be accessed by said torque values and said speed values.

* * * * *

UNITED STATES PATENT AND TRADEMARK OFFICE
CERTIFICATE OF CORRECTION

PATENT NO. : 5,878,189
DATED : March 2, 1999
INVENTOR(S) : Robert Lankin, et al.

It is certified that error appears in the above-identified patent and that said Letters Patent is hereby corrected as shown below:

Col. 7, lines 31 and 32, "corresponding t here to" should be --corresponding thereto--.

Col. 8, line 2, "values i n" should be --values in--.

Signed and Sealed this

Third Day of August, 1999

Attest:

Q. TODD DICKINSON

*Attesting Officer*   *Acting Commissioner of Patents and Trademarks*